United States Patent [19]

Markus et al.

[11] Patent Number: 5,396,222

[45] Date of Patent: Mar. 7, 1995

[54] ERGONOMIC MACHINE ACTUATOR

[75] Inventors: Joseph E. Kus, Norwalk, Ct.; Richard Markus, Bridgeport; Ralph A. Stearns, Bozrah; Charles Noel, Hamden; Aquin Valentino, East Haven; David Cullen, Wallingford; Manfred Deimold, North Haven, all of Conn.

[73] Assignee: United States Surgical Corporation, Norwalk, Conn.

[21] Appl. No.: 36,674

[22] Filed: Mar. 25, 1993

[51] Int. Cl.⁶ .............................................. G08B 21/00
[52] U.S. Cl. ..................................... 340/679; 361/181
[58] Field of Search ................ 340/679, 407; 345/156, 345/163, 166; 361/173, 179, 181, 190

[56] References Cited

U.S. PATENT DOCUMENTS

| | | | |
|---|---|---|---|
| 2,695,402 | 11/1954 | Gray | 307/125 |
| 3,525,028 | 8/1970 | Ruoss et al. | 318/446 |
| 3,651,391 | 3/1972 | Vogelsberg | 318/446 |
| 3,813,021 | 5/1974 | Kramer | 192/131 R |
| 4,195,722 | 4/1980 | Anderson et al. | 192/131 R |
| 4,291,359 | 9/1981 | Dieterle | 307/326 |
| 4,412,268 | 10/1983 | Dassow | 361/181 |
| 4,493,377 | 1/1985 | Günther et al. | 192/131 R |
| 4,794,273 | 12/1988 | McCullough et al. | 307/326 |
| 4,917,516 | 4/1990 | Retter | 345/163 |
| 4,918,560 | 4/1990 | Storer | 361/190 |
| 5,212,621 | 5/1993 | Panter | 361/181 |

OTHER PUBLICATIONS

Triad Controls Inc. Brochure, 1990.
Banner Engineering Corp. Brochure (undated).

*Primary Examiner*—John K. Peng
*Assistant Examiner*—Benjamin C. Lee

[57] ABSTRACT

The present invention relates to a machine actuating system, which includes a hand actuator system which responds to the presence of at least one operator body part at a predetermined location by generating control signal and an actuator control system to actuate the machine in response to the control signal. Generally, the actuating system includes a pair of ergonomic support members, where one support member is configured and dimensioned for interactive association with the operator's left hand and the other support member is configured and dimensioned for interactive association with the operator's right hand, and a sensing system associated with each support member for sensing the presence of the operator's hands and generating the control signal.

33 Claims, 11 Drawing Sheets

ERGONOMIC MACHINE ACTUATOR

BACKGROUND OF THE INVENTION

1. Field of the Invention

The present invention relates to a system and method to ergonomically and safely activate machinery. More particularly, the present invention relates to a finger sensitive ergonomic machine actuator.

2. Description of the Related Art

The potential for accidental injury during the operation of many types of industrial machines has resulted in the production of numerous devices to protect the operators of such machines from injury. One common form of protection for the operator is to provide two spatially placed pushbutton switches which requires the operator to press both switches in order to activate the machine. However, often, machinery controlled by pushbutton switches continues to operate when the operator removes his hands from the switches which allows the operator the opportunity to move his or her hands. Another form of protection is to provide mechanical guards which block the operator's access to the machine when the machine is in operation.

While these types of protection work well when properly operated, situations may occur when the operator bypasses these safety devices and thereby increase the risk of accidental injury. For example, the operator may press the two spatially placed pushbutton switches to activate the machinery, then quickly place his or her hands near active parts in the machine so they can quickly retrieve the article within the machinery. Such action may cause serious injury if the hand or any other body part enters the area where machine parts are moving. As another example, the operator may remove any mechanical guards provided so as to increase the speed of operation and again may suffer injury if hand or any other body part enters the area where machine parts are moving.

Aside from the above described mechanical drawbacks of current machine safety devices, other problems arise when an operator has to repeatedly press pushbutton switches or the like in order to activate machinery. Such repetitive action may result in Cumulative Trauma Disorders. Cumulative Trauma Disorders (CTD's) are injuries caused over a period of time by repeated exposure to stresses on particular body parts. The most common type of CTD to affect machine operators is Carpal Tunnel Syndrome. Carpal Tunnel Syndrome (CTS) is caused by using the fingers while the wrist is in a flexed or extended, i.e., a non-neutral position. The farther the wrist is bent from the neutral position, the more muscle pressure and tendon tension is required to do a given amount of work. Tendons in the underside of the wrist become compressed and inflamed and press on the median nerve, which supplies feeling in the thumb, index, middle and ring fingers. Health effects can range from slight numbness and tingling to severe pain and muscle atrophy. The more tendon tension that is exerted while the wrist is bent, the more potentially severe the effects.

Therefore, a need exists to provide a machine actuation system which incorporates ergonomic principles and which provides safe operation when properly used. The present invention provides such a system.

SUMMARY OF THE INVENTION

The present invention relates to a machine actuating system, which comprises actuation means responsive to the presence of at least one operator body part in predetermined location to generate control signal to facilitate actuation of the machine, and control means for receiving and processing the control signal and for actuating the machine. Preferably, the activation means comprises at least one ergonomically configured and dimensioned member for interacting with the at least one operator body part, sensing means associated with the at least one ergonomically configured and dimensioned member for sensing the presence of the at least one operator body part in the predetermined location and communication means connected between the at least one ergonomically configured and dimensioned member and the control means for transmitting the control signal to the control means.

The sensing means of the present invention may comprise an array of infrared sensors which sense the presence of the at least one operator body part, or an array of stainless steel pickups which sense the presence of the at least one operator body part. Generally, the array of stainless steel pickups are responsive to the resistivity between portions of each respective operator hand.

The control means of the present invention, comprises a housing, processing means for receiving the control signal and generating actuation signal to facilitate actuation of the machinery and machine control means responsive to the actuation signal for actuating the machine. Generally, the processing means comprises a microprocessor, memory and stored programs for execution by the microprocessor. The processing means is provided to monitor the actuation means for a predetermined activation sequence. In addition, the processing means monitors the actuation means for a predetermined time after the actuation sequence so as to ensure the presence of the operator after actuation of the machine. In the preferred embodiment, the machine control means associated with the control means of the present invention, comprises an electrical control portion having means for receiving the actuation signal from the processing means and means responsive to the actuation signal for electrically actuating the machinery and a pneumatic control portion having means for receiving the actuation signal from the processing means and means responsive to the actuation signal for pneumatically actuating the machinery.

In an alternative embodiment, the machine actuating system of the present invention comprises a pair of ergonomic support members, each configured and dimensioned for interactive association with an operator's hands, the first support member configured for the operator's left hand and the second support member configured for the operator's right hand, sensing means associated with each support member for sensing the presence of the respective operator's hand at a predetermined location with respect thereto and for generating control signal to facilitate actuation of the machine, and control means operatively connected to the pair of support members for receiving and processing the control signal and for actuating the machine. Each pair of support members may be positioned on slide means to facilitate relative planar movement of each support member or each pair of support members may be positioned on pivoting means to facilitate pivotal movement of each support member, or each support member may be positioned on a combination of the slide means and pivoting means.

In another alternative embodiment, the machine actuating system of the present invention, comprises actuation means responsive to the presence of at least one operator body part in predetermined location to generate control signal to facilitate actuation of the machine and a machine controller having means for operatively connecting the actuation means to an external processing system so that the external processing system receives the control signal. The machine control means is also responsive to actuation signal received from the external processing system for controlling the operation of the machine. In this embodiment, the actuation means comprises an elongated ergonomic support member having a first portion configured and dimensioned for interactive association with the operator's left hand and a second portion configured and dimensioned for interactive association with the operator's right hand, sensing means associated with the first and second hand portions for sensing the presence of the respective operator's hand at a predetermined location with respect to the hand portions and for generating control signal to facilitate actuation of the machine and communication means connected between the elongated support member and the control means for transmitting the control signal to the control means.

The present invention also relates to a method for actuating a machine subject to satisfaction of predetermined conditions, wherein at least one actuation means is provided and responsive to the presence of an operator body part. The method includes the steps of positioning the at least one operator body part in predetermined location with respect to the actuation means to generate control signal to facilitate actuation of the machine and transmitting the control signal to control means for receiving and processing the control signal and actuating the machine.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
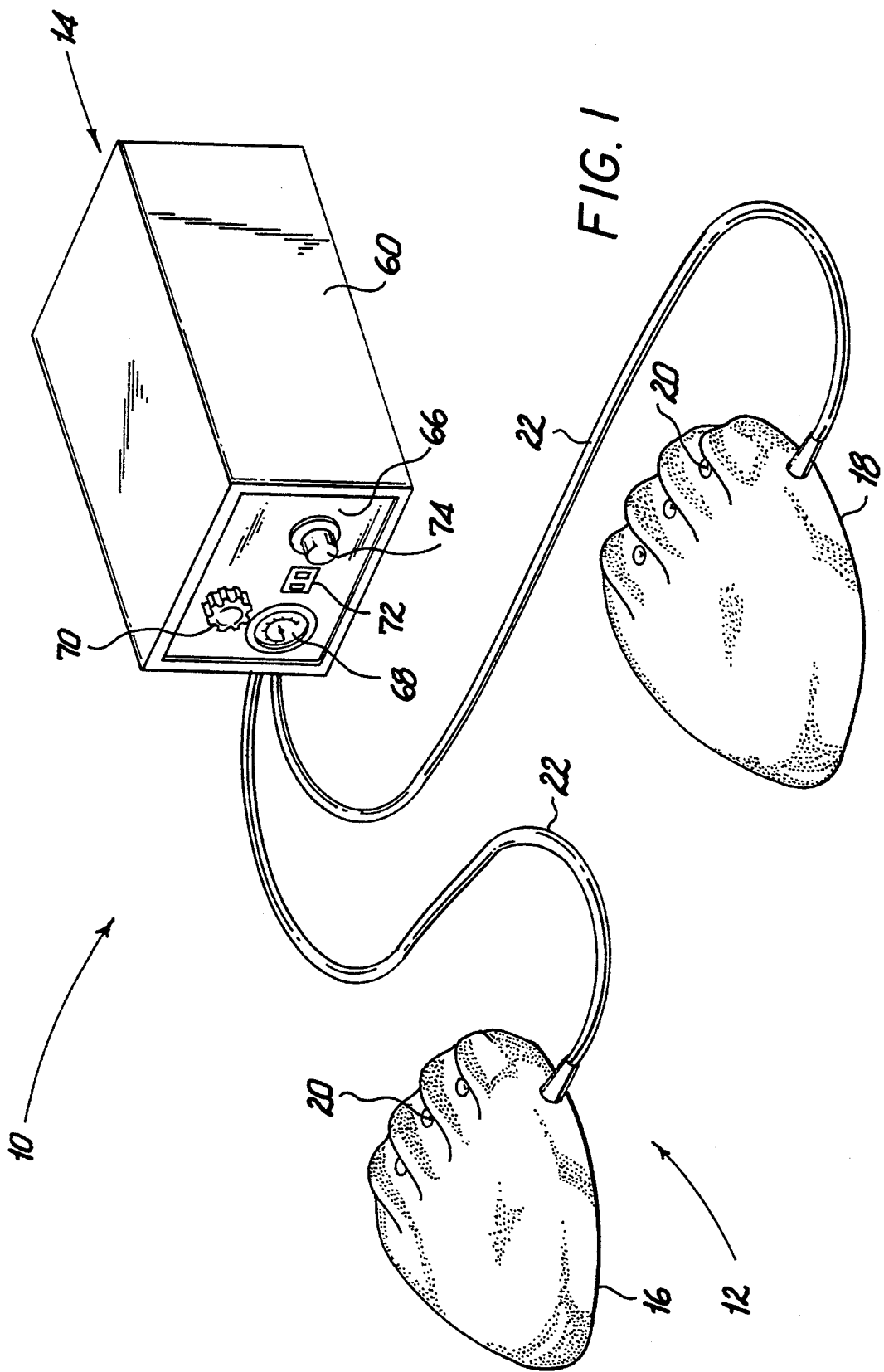
FIG. 1 is a perspective view of the machine actuating system of the present invention illustrating a hand actuator system connected to an actuator control system.

Referring to FIG. 1, the machine actuating system of the present invention generally indicated by the numeral 10, includes hand actuator system 12 and actuator control system 14. As will be described below, the machine actuating system is provided to maximize operator productivity and safety when properly used, while minimizing operator stress during operation.

Referring again to FIG. 1, the hand actuator of the present invention will be described. Preferably, hand actuator system 12 includes two separate hand actuators, left hand actuator 16 and right hand actuator 18. Generally, each actuator is fabricated for universal operation, i.e., provides indentations and grooves for each finger of hands of all sizes. In addition, actuators 16 and 18 are ergonomically shaped to facilitate maximum relaxation of the operator's hand, thereby avoiding stress in the hand, wrist and arm. This ergonomic design of the hand actuators, allows operators to place their hands onto the actuators and to remain in a position which does not cause stress to the hand, wrist or arm. Actuators 16 and 18 are provided with sensors 20 which actuate the machine when an operator's fingers are within close proximity to or in contact with the sensors within a predetermined period of time, as will be described in more detail below. Sensors 20 may be positioned in each finger slot of each actuator (i.e., five sensors per actuator) to form a sensor array. Preferably, the sensor array includes three finger sensors per actuator, as shown in FIG. 1. Sensors 20 are electrically connected to actuator control system 14 via data links 22. Preferably, sensors 20 are infrared sensors such as model EE-SS101 manufactured by Omron Corp., Schaumborg, Ill. However, sensors 20 may be other known types of sensors. For example, sensors 20 may be stainless steel pickups, which are interconnected to the actuator control system so that the resistivity measured between each finger in contact with a sensor is substantially the same as predetermined resistivity measurements stored within the internal memory of the control system. Preferably, the resistivity range is sufficient to accurately determine the presence of the appropriate number of fingers, while still being capable of detecting the improper placement or absence of at least one finger from a corresponding sensor.

Figure 2:
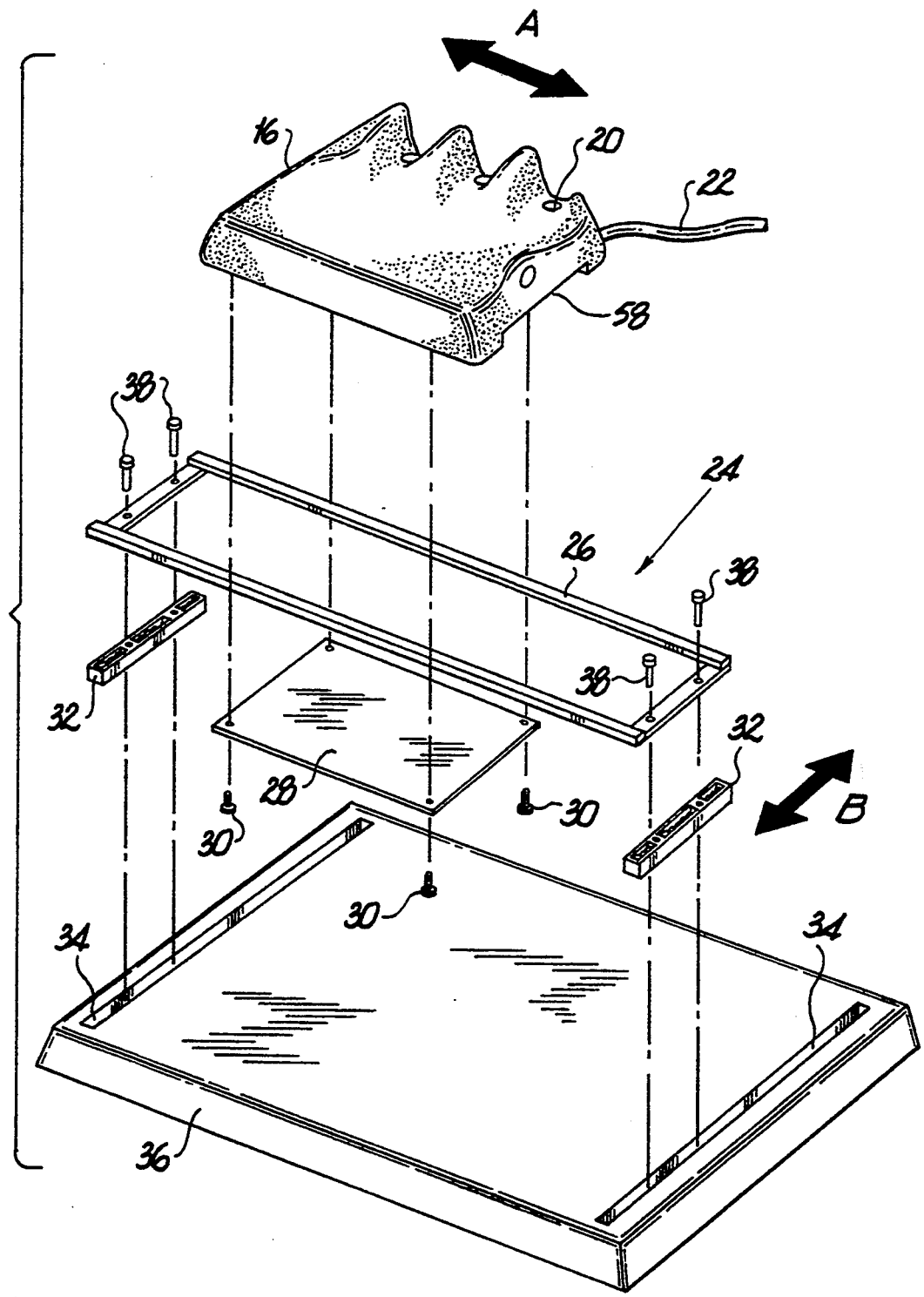
FIG. 2 is a perspective view with parts separated, of an alternative embodiment of the hand actuator system of FIG. 1, illustrating the hand actuator connected to a movable guide system.

Generally, hand actuators 16 and 18 are secured to an operator station (not shown) away from the machinery and spatially orientated for use by the operator. Alternatively, hand actuators 16 and 18, may be separately positioned on guide system 24, as shown in FIG. 2. Guide system 24 allows the operator to slide the hand actuator in the x-y plane, i.e., in a longitudinal direction (shown by arrow "A") and/or a direction transverse to the longitudinal direction (shown by arrow "B"). In this configuration, the hand actuators are adaptable for use by individuals of various sizes, while maintaining the above noted ergonomic properties.

Continuing to refer to FIG. 2, guide system 24 includes longitudinal slide track 26 which is slidably mounted to either hand actuator 16 or 18 in combination with support plate 28 and screws 30, as shown. Friction reducing devices or elements (not shown) may be positioned between the hand actuator and slide track 26 and/or between plate 28 and the slide track to facilitate relative ease of longitudinal motion of the hand actuator. To facilitate movement of the hand actuator traverse to the longitudinal axis, guide arms 32 are, preferably, secured at each longitudinal end of slide track 26, so as to engage transverse guideways 34 and allow for axis of the hand actuators in a direction transverse to the longitudinal axis of slide track 26. Transverse guideways 34 are spaced apart, as shown, on base support 36 so that they are capable of receiving guide arms 32 secured to slide track 26 by screws 38.

Figure 3:
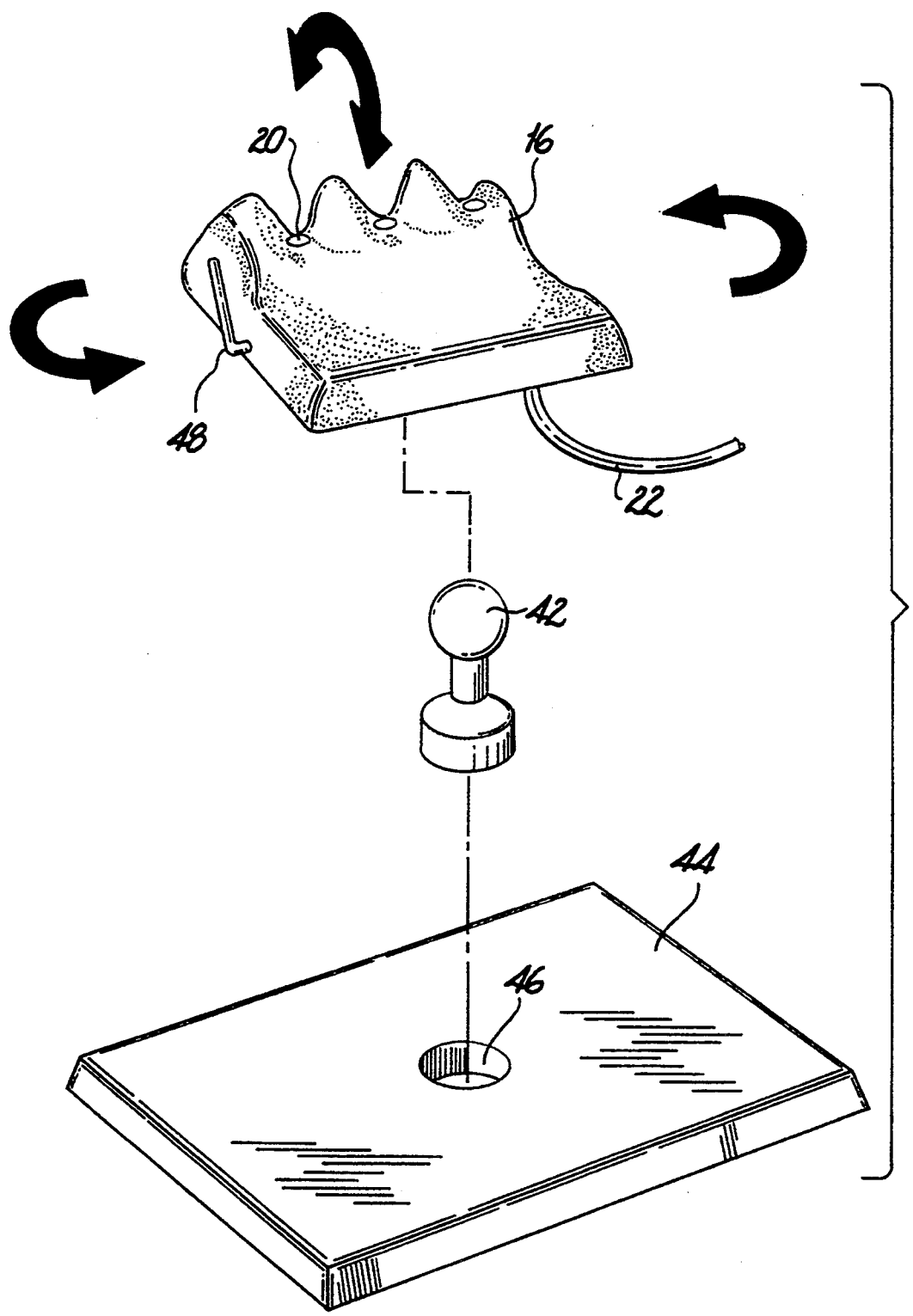
FIG. 3 is a perspective view with parts separated, of the hand actuator system of FIG. 1 connected to a universal pivoting system.

Turning now to FIG. 3, hand actuators 16 and 18 may be separately and individually positioned on pivoting system 40 as shown. Pivoting system 40 allows the operator to independently pivot and/or rotate each hand actuator to a position which increases the operator's comfort and reduces stress on the operator's hand and/or wrist. Preferably, pivoting system 40 includes universal pivot pin 42 secured to base 44 through aperture 46 by adhesives, friction, screws or like securing methods. Additionally, locking arm 48 may be positioned on the hand actuator, such that when pivoted or rotated an engaging surface (not shown) of locking arm 48 frictionally engages pivoting pin 42 sufficiently to lock the hand actuator at its current position.

Figure 4:
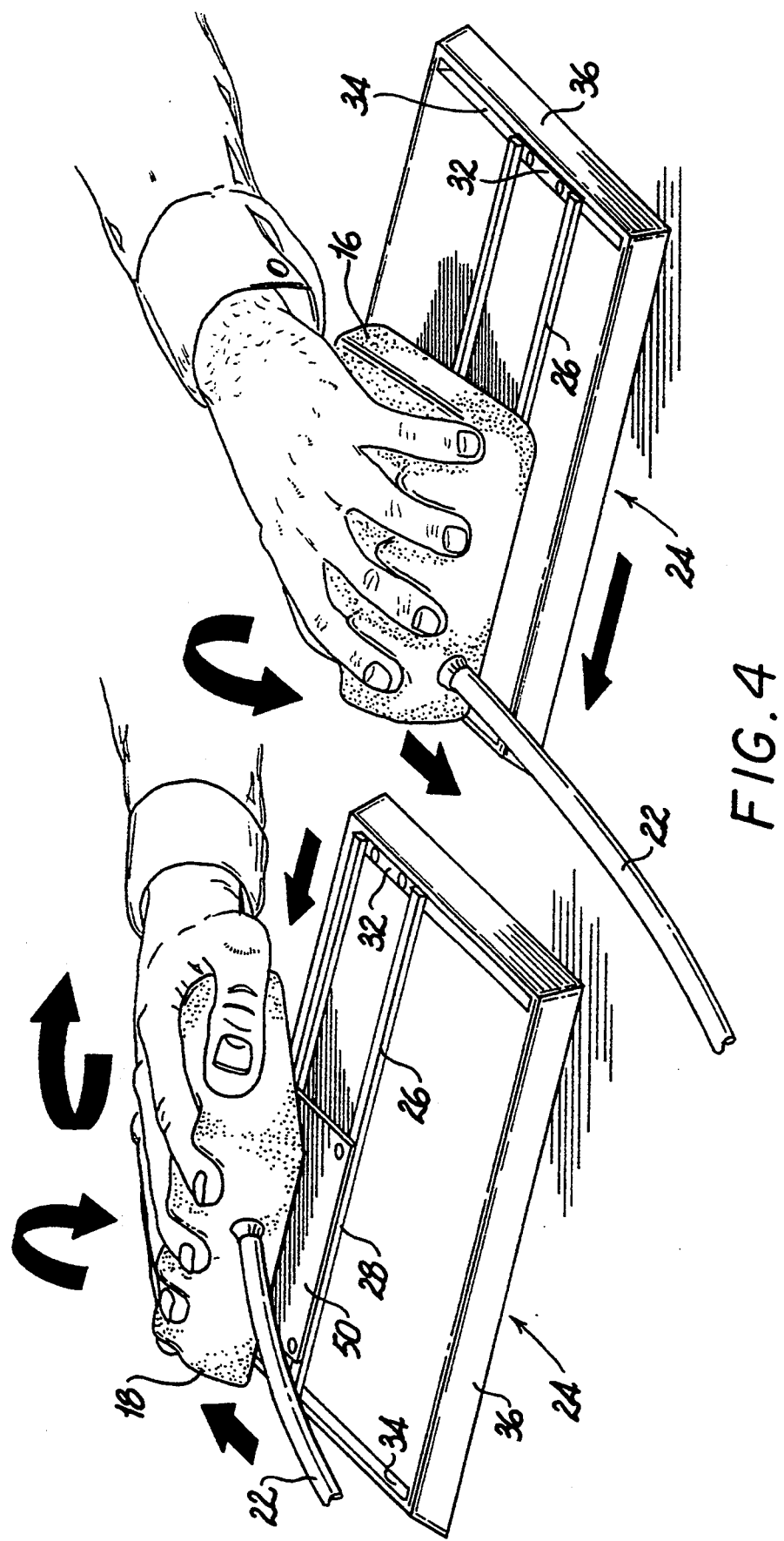
FIG. 4 is a perspective view of another embodiment of the hand actuator system of FIG. 1, illustrating the hand actuator connected to a combination of the guide system of FIG. 2 and the universal pivoting system of FIG. 3.

In an alternative embodiment, shown in FIG. 4, the hand actuator system 12 includes two separate hand actuators 16 and 18, each of which are mounted on pivoting system 40 combined with guide system 24, as described hereinabove. However, in this embodiment, pivot pin 42 is secured to upper plate 50 which is secured to support plate 28 so that slide track 26 is positioned therebetween, as shown. Friction reducing devices or elements (i.e., bearings, lubricants or the like, not shown) may be positioned between the plates and the slide track to facilitate relative ease of longitudinal motion of the hand actuator. This configuration allows the operator to adjust the position of the hand actuators while allowing for pivotal and/or rotational movement of the actuators.

Figure 5:
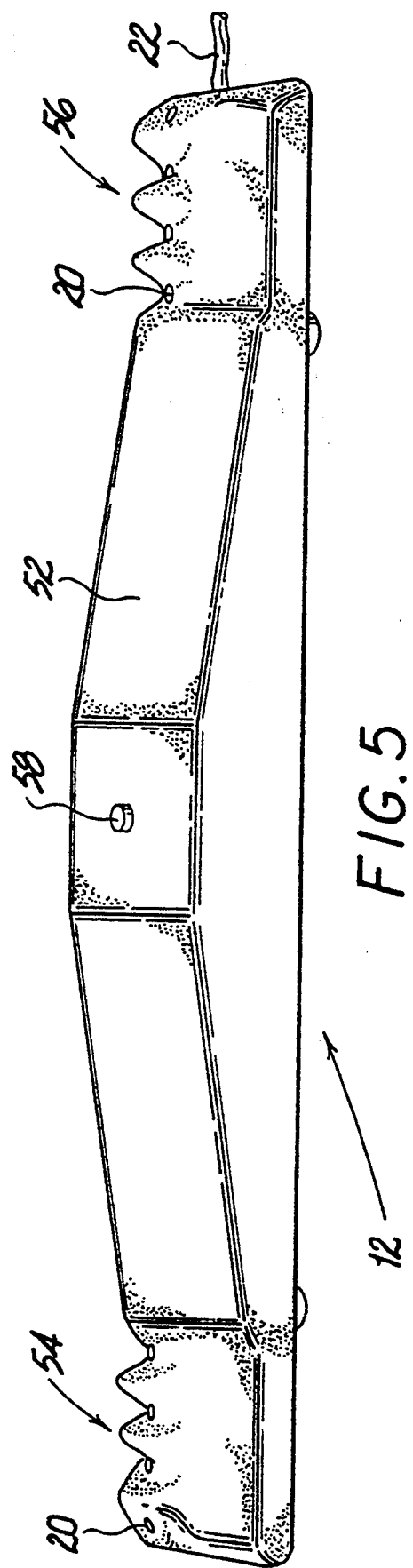
FIG. 5 is a perspective view of another alternative embodiment of the hand actuator system of FIG. 1.
Figure 6:
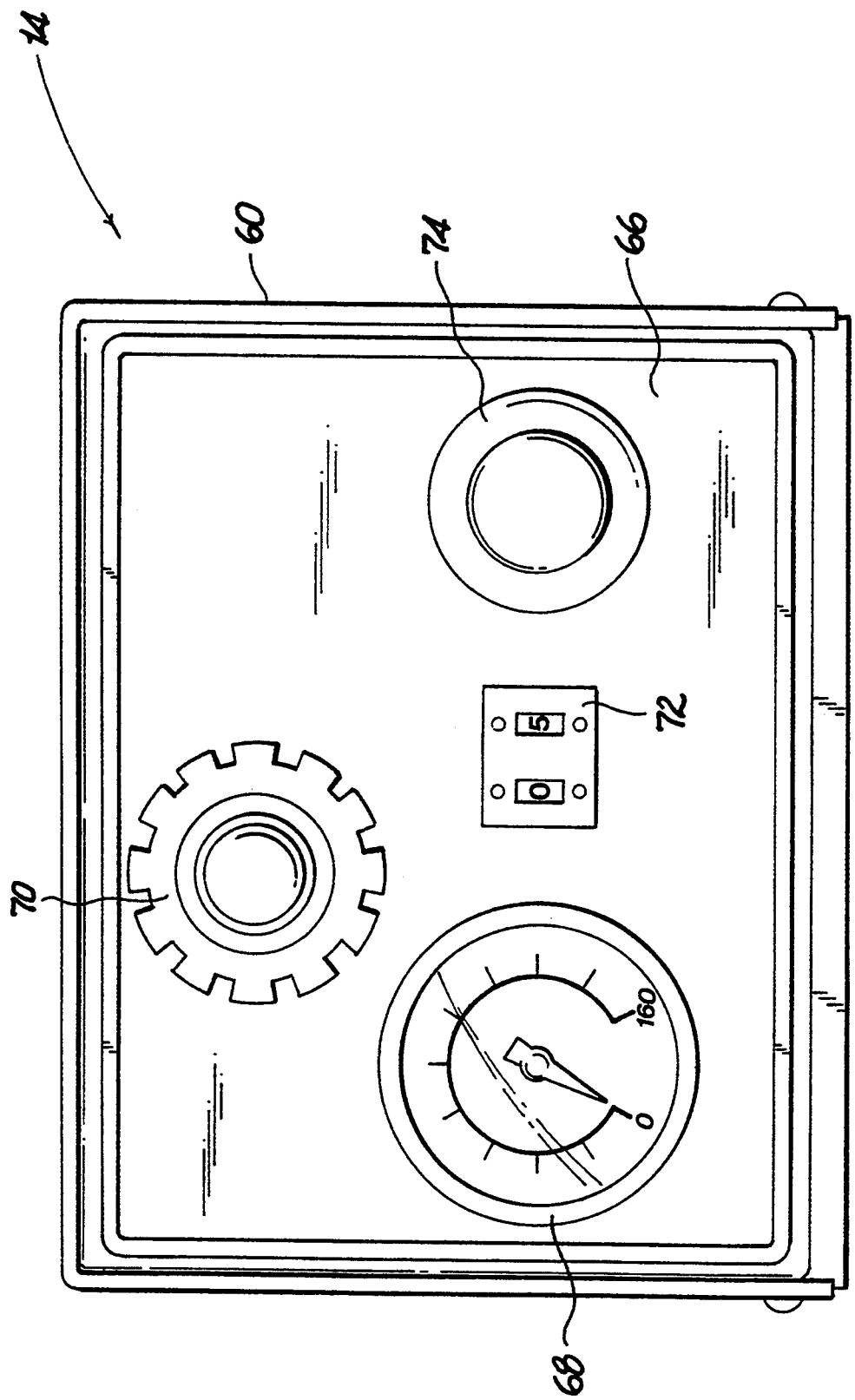
FIG. 6 is a front plan view of the actuator control system of FIG. 1, illustrating various electric and pneumatic controls associated with the system.

In another alternative embodiment shown in FIG. 5, hand actuator system 12 may be a single frame 52 having left hand and right hand actuators 54 and 56 positioned thereon or formed therein. Single frame 52 may also include stop switch 58 which is operatively connected to actuator control system 14 and allows the operator to quickly stop the operation of the machinery in a manner which will be described in more detail below.

Figure 7:
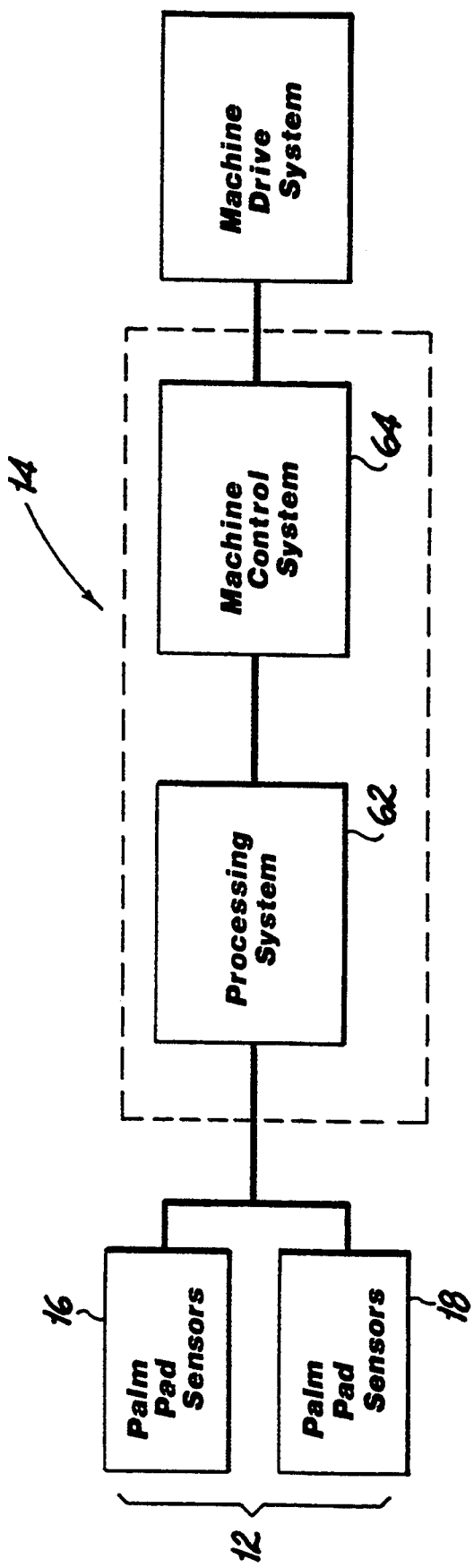
FIG. 7 is a block diagram of the system configuration for the machine actuating system of the present invention.
Figure 8:
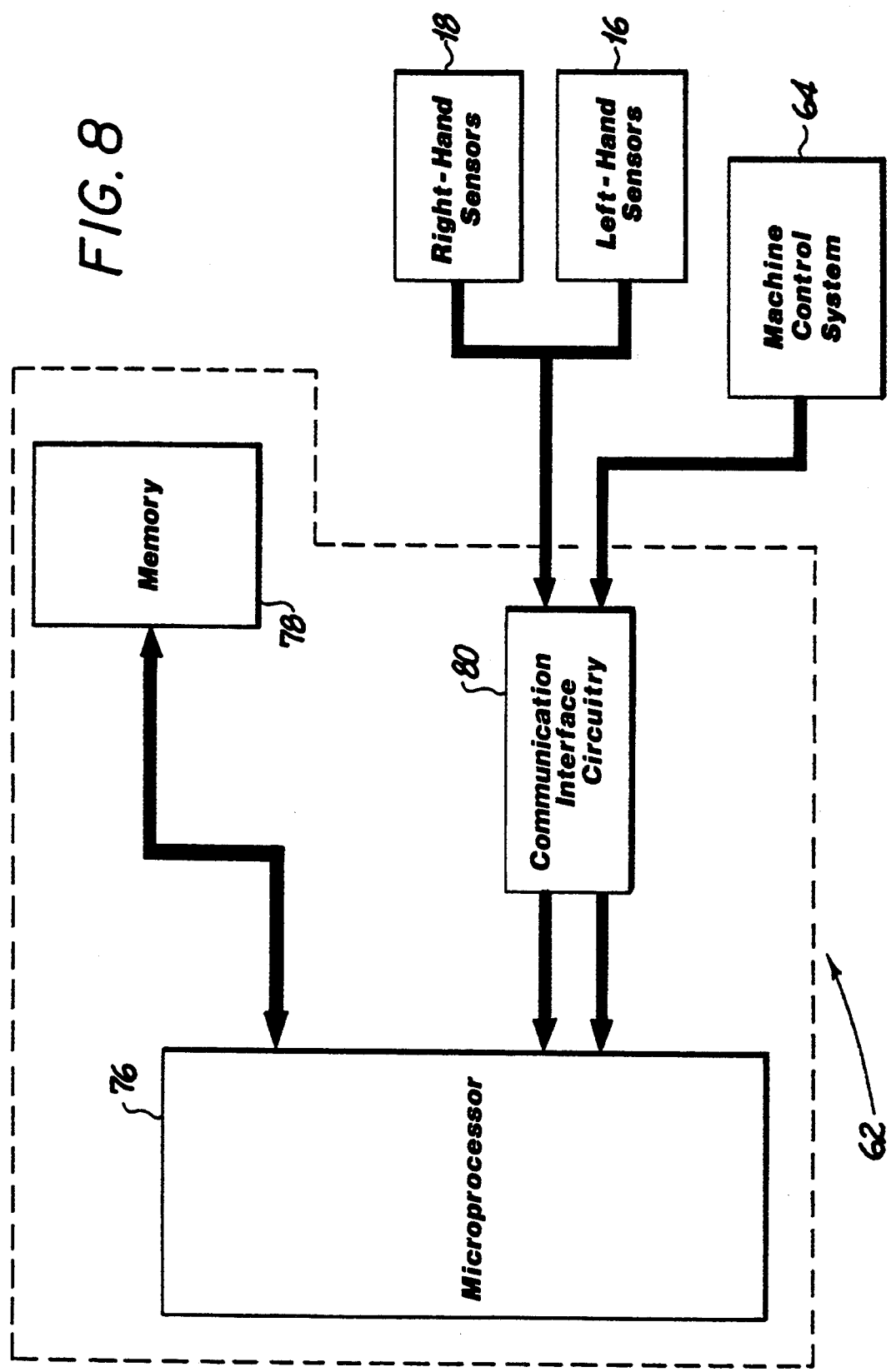
FIG. 8 is a block diagram of an exemplary processing system utilized within the actuator control system of the present invention.

Referring now to FIGS. 1 and 6–8, actuator control system 14 generally includes housing 60 which supports processing system 62 and machine control system 64, both of which are shown as functional blocks in FIG. 7. Front panel 66 of housing 60 includes pneumatic gauges and controls, such as air pressure gauge 68 and air regulator 70, and electric controls such as thumbwheel switch 72 and stop switch 74. For example, air pressure gauge 68 provides the machine operator with a visual indication of the air pressure supplied to the machinery being actuated, while, air regulator 70 limits the air pressure supplied thereto. Preferably the air supplied to the machinery ranges between about 25 psi and about 140 psi. Switch 72 is electrically connected to the processing system and is provided to enable the operator to preset a cycle duration period. The cycle duration period is the period of time the machine is allowed to cycle after proper activation of the sensors, as will be described in more detail below. Stop switch 74 is also electrically connected to the processing system and is provided to automatically cause the machinery to return to the normal state when actuated.

Preferably, machine control system 64, shown as a functional block in FIG. 7, has an electric control portion for controlling electric motors and the like, and a pneumatic control portion for controlling pneumatic pistons and the like. However, machine control system 64 may include various types of control systems, for example, a hydraulic control portion may be provided to control the operation of hydraulic pistons and the like.

Typically, the electric control portion includes relays, switches, feedback control circuits and like devices, which are responsive to control or enable signals received from the processing system. Such electrical devices and the various configurations thereof are known in the art. On the other hand, the pneumatic control portion includes pneumatic gauges, valves and connectors and like devices for air exhaust, air advance, air retracting functions. The pneumatic control portion is also responsive to control or enable signals received from the processing system. Such pneumatic devices and the various configurations thereof are also known in the art.

Referring again to FIG. 7, processing system 62 is provided as an interface between hand actuators 16 and 18 and machine control system 64. Processing system 62 monitors each hand actuator for the proper activation sequence and provides control or enable signals to machine control system 64 to cause actuation of the machinery. Processing system 62, shown as a block diagram in FIG. 8, may include microprocessor 76, memory 78 (e.g., read only memory and/or random access memory) and stored programs such as system and application programs. Communication interface circuitry 80 provides communication links between hand actuating system 12 and microprocessor 76, and between the microprocessor and machine control system 64. Such devices and the various configurations thereof are known in the art. Preferably, the processing system includes a SLC 500 microprocessor manufactured by Allen Bradley.

As mentioned above, processing system 62 monitors hand actuator system 12 for the proper activation sequence. To properly activate the sensor array the operator places their hands on a corresponding hand actuator so that a predetermined number of fingers are positioned in close proximity to or in contact with corresponding sensors (i.e., the activating position). Preferably, three sensors are positioned in the recessed cavities of each hand actuator, as shown in FIG. 1, to ensure that the operator activates the machine with both hands placed on a corresponding hand actuator. However, the number of sensors within the sensor array may vary. For example, the number of sensors on each hand actuator may be selected such that the machine can be actuated by placing one finger on each hand actuator or by placing five fingers on each hand actuator or any combination thereof. Processing system 62 measures the time differential between the placement of the first finger adjacent to a corresponding sensor and the placement of the last finger adjacent to a corresponding sensor so as to prevent the operator from tying down one of the sensors. If the time differential is within a predetermined range then the sensor array will be properly activated. Preferably, the predetermined time differential is between zero and one-half second. As an illustration, if each hand actuator has three sensors, as shown in FIG. 1, the sensor array monitored by processing system 62 includes six sensors. The time differential between the activation of the first sensor and the activation of the sixth sensor should be between zero and one-half second in order to have proper activation of the sensor array.

Processing system 62 may interrupt operation of the machinery before the expiration of the cycle duration period, if a predetermined number of the operator's fingers are removed from the activating position within a predetermined period of time after the actuation of the machinery. Preferably, if the operator removes one finger from the activating position within one second of actuating the machinery, the operation of the machinery will be interrupted. Processing system 62 also includes a so-called "anti-diddle" feature which inhibits the operation of the machinery after a predetermined number, preferably three, of failed attempts to properly activate the machinery within the above noted one-half second and/or one second periods. In addition, stop switch 58 or 74, shown in FIGS. 5 and 6, respectively, may be utilized to interrupt the operation of the machine cycle. When processing system 62 interrupts operation of the machine cycle, the machinery is automatically returned to its initial inactive or steady-state position. To illustrate, if the machinery being controlled is a pneumatic press and processing system 62 in combination with machine control system 64 interrupts operation of the press, the pneumatic press will be inhibited from completing its press cycle and the press piston will be retracted to its steady-state position.

Figure 9:
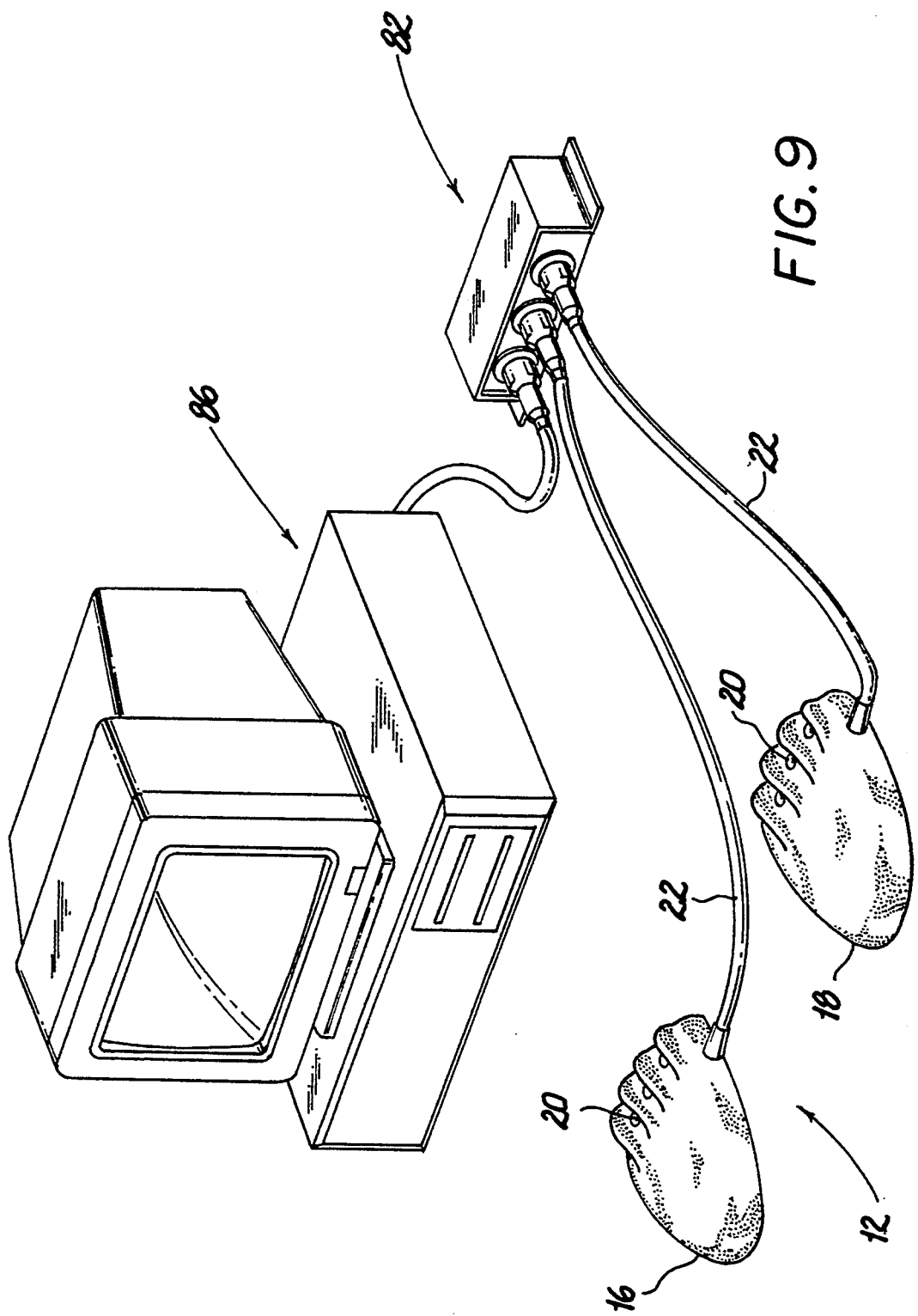
FIG. 9 is a perspective view of an alternative embodiment of the machine actuating system of the present invention, illustrating a control system for electric and pneumatic controls and a data link for interfacing the actuator control system with an external computer.
Figure 10:
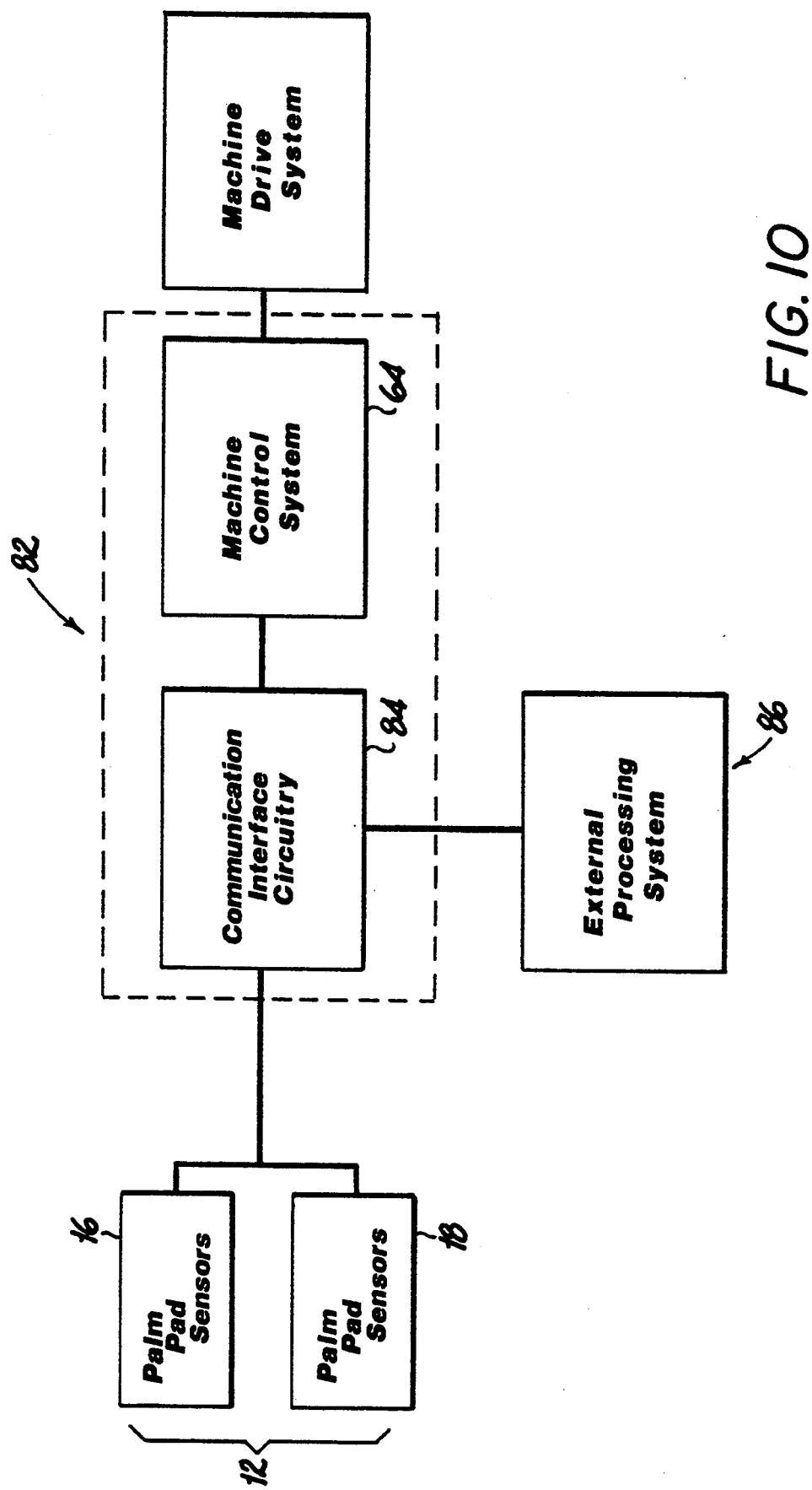
FIG. 10 is a block diagram of the system configuration for the machine actuating system of FIG. 9.

An alternative embodiment of the machine actuating system of the present invention is shown in FIGS. 9 and 10. In this embodiment, hand actuator system 12 is similar in construction and operation to the hand actuator system described above. However, basic actuator control system 82 is provided as an interface between an external processing system, the hand actuator system and the machinery. In this configuration, shown in FIG. 10, basic actuator control system 82 includes communication interface circuitry 84 which transmits enable or control signals from hand actuator system 12 to external processing system 86. In addition, interface circuitry 84 receives actuation signals generated by the external processing system, thus, causing the pneumatic and/or electric control portions of machine control system 64 to actuate the machinery.

Figure 11:
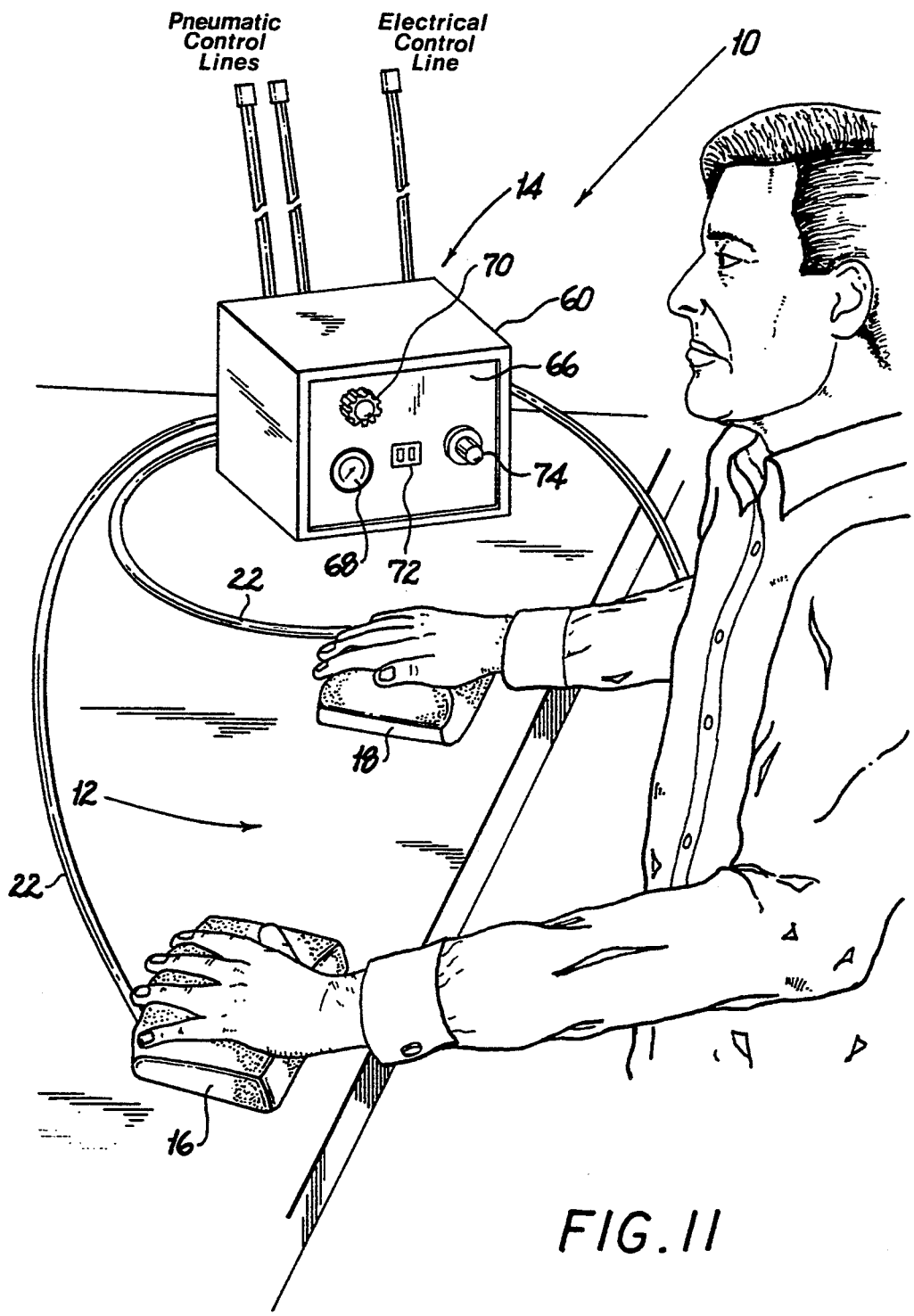
FIG. 11 is a perspective view of the machine actuating system of the present invention illustrating an operator with hands in the actuation position.

In operation, an operator actuates the machinery being controlled by placing each hand in the activating position, as shown in FIG. 11. The activating position corresponds to the placement of the hands on a corresponding hand actuator 16 or 18 so that a predetermined number of fingers are positioned in close proximity to or in contact with corresponding sensors in the sensor array, sufficiently to cause activation thereof. Preferably, as noted above, the time between activation of the first sensor and activation of the last sensor is one-half second so as to ensure that the operator's hands are properly positioned on the actuators prior to actuation of the machinery.

Once the sensor array is properly activated, processing system 62 generates and transmits a control or enabling signal to machine control system 64 to actuate the machinery, and continues to monitor the sensor array to ensure that the array has been activated for at least one second. Removal of any finger from the activating position within this one second period aborts the cycling of the machinery. As mentioned above, if the cycling of the machinery is aborted or interrupted, machine control system 64 will return the machine cycle to the normal steady-state.

After proper actuation of the machinery, processing system 62 automatically resets the system logic so as to prevent the operator from recycling the machinery, e.g., prevents double firing of the machine cycle, until the operator's hands are removed from each hand actuator.

When the sensor array is properly activated for the predetermined period of time, processing system 62 continues to transmit the control or enable signal to the machinery until the cycle duration period expires.

It will be understood that various modifications can be made to the embodiments of the present invention herein disclosed without departing from the spirit and scope thereof. For example, various sizes of the instrument are contemplated, as well as various types of construction materials. Also, various modifications may be made in the configuration of the parts. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. Machine actuating system, which comprises:
    a) an ergonomically configured and dimensioned machine actuator which includes a support member having a first portion configured and dimensioned for interactive association with an operator's left hand and a second portion configured and dimensioned for interactive association with the operator's right hand and having a pair of sensor arrays associated with said first and second hand portions respectively, said sensor arrays each being responsive to the presence of a corresponding plurality of body parts of the operator in predetermined locations to generate a control signal to facilitate actuation of the machine; and
    b) control means for receiving and processing said control signal and for actuating the machine.

2. The machine actuating system according to claim 1, wherein said control means comprises:
    a) a housing;
    b) processing means for receiving said control signal and generating actuation signal to facilitate actuation of the machinery; and
    c) machine control means responsive to said actuation signal for actuating the machine.

3. The machine actuating system according to claim 2, wherein said processing means monitors said machine actuator for a predetermined actuation sequence.

4. The machine actuating system according to claim 3, wherein said processing means monitors said machine actuator for a predetermined time after said actuation sequence so as to ensure the presence of the operator body parts after actuation of the machine.

5. The machine actuating system according to claim 2, wherein said processing means comprises a microprocessor, memory and stored programs for execution by said control means.

6. The machine actuating system according to claim 2, wherein said machine control means comprises an electrical control portion having means for receiving said actuation signal from said processing means and means responsive to said actuation signal for electrically actuating the machinery.

7. The machine actuating system according to claim 2, wherein said machine control means comprises a pneumatic control portion having means for receiving said actuation signal from said processing means and means responsive to said actuation signal for pneumatically actuating the machinery.

8. The machine actuating system according to claim 1, wherein each of said pair of sensor arrays comprises an array of stainless steel pickups which sense the presence of each respective operator body parts at said predetermined locations.

9. The machine actuating system according to claim 8, wherein said array of stainless steel pickups are responsive to the resistivity between portions of each respective operator body parts.

10. The machine actuating system according to claim 1, further comprises communication means connected between said machine actuator and said control means for transmitting said control signal to said control means.

11. The machine actuating system according to claim 1, wherein said sensor arrays each comprises an array of infrared sensors which sense the presence of the corresponding operator body parts.

12. The machine actuating system according to claim 1, wherein said sensor arrays each comprise an array of stainless steel pickups which sense the presence of the corresponding operator body parts.

13. The machine actuating system according to claim 1, further comprises communication means connected between said support member and said control means for transmitting said control signal to said control means.

14. The machine actuating system according to claim 1, wherein each of said pair of sensor arrays comprises an array of infrared sensors which sense the presence of each respective operator body parts at said predetermined locations.

15. Machine actuating system, which comprises:
a) a pair of ergonomic support members, each configured and dimensioned for interactive association with an operator's hand, wherein a first support member configured for the operator's left hand and a second support member configured for the operator's right hand;
b) a sensor array associated with each said support members which determines the presence of the respective operator's hand by sensing the presence of a plurality of fingers on the operator's hand at a predetermined location with respect thereto, and which generates a control signal to facilitate actuation of the machine; and
c) control means operatively connected to said pair of support members for receiving and processing said control signal and for actuating the machine.

16. The machine actuating system according to claim 15, wherein said sensor array comprises an array of infrared sensors which sense the presence of each respective operator hand at said predetermined location.

17. The machine actuating system according to claim 15, wherein said sensor array comprises an array of stainless steel pickups which sense the presence of each respective operator hand at said predetermined location.

18. The machine actuating system according to claim 15, wherein said control means comprises:
a) a housing;
b) processing means for receiving said control signal and generating actuation signal to facilitate actuation of the machinery; and
c) machine control means responsive to said actuation signal for actuating the machine.

19. The machine actuating system according to claim 15, wherein each of said pair of support members are positioned on slide means to facilitate relative planar movement of each support member.

20. The machine actuating system according to claim 15, wherein each of said pair of support members are positioned on pivoting means to facilitate pivotal movement of each support member.

21. Machine actuating system, which comprises:
a) a pair of ergonomic supports, each being configured and dimensioned for interactive association with a respective one of an operator's left and right hands, and each having a configured array of motionless sensors responsive to the presence of a corresponding plurality of fingers of the respective operator hand in predetermined locations to generate a control signal to facilitate actuation of the machine in response to the presence of the corresponding fingers on the corresponding sensors of the arrays; and
b) a machine controller having means for operatively connecting said pair of ergonomic supports to an external processing system so that the external processing system receives said control signal, said machine controller being responsive to actuation signal received from the external processing system for controlling the operation of the machine.

22. The machine actuating system according to claim 21, wherein said pair of supports are unitarily positioned as elongated ergonomic support member.

23. The machine actuating system according to claim 22, wherein each of said pair of sensor arrays comprises an array of stainless steel pickups which sense the presence of each respective operator fingers at said predetermined location.

24. The machine actuating system according to claim 23, wherein said array of stainless steel pickups are responsive to the resistivity between respective operator fingers.

25. The machine actuating system according to claim 22, wherein said actuation means further comprises communication means connected between said elongated support member and said machine controller for transmitting said control signal to said machine controller.

26. The machine actuating system according to claim 22, wherein each of said pair of sensor arrays comprises an array of infrared sensors which sense the presence of each respective operator fingers at said predetermined locations.

27. The machine actuating system according to claim 21, further comprises actuating means comprising:
communication means connected between each of said pair of supports members and said machine controller for transmitting said control signal to said machine controller.

28. The machine actuating system according to claim 27, wherein said sensor array comprises an array of infrared sensors which sense the presence of the plurality of operator fingers in said predetermined locations.

29. The machine actuating system according to claim 27, wherein said sensor array comprises an array of stainless steel pickups which sense the presence of the plurality of operator's fingers in said predetermined locations.

30. The machine actuating system according to claim 27, wherein each of said pair of supports are positioned on slide means to facilitate relative planar movement of each support member.

31. The machine actuating system according to claim 27, wherein each of said pair of supports are positioned on pivoting means to facilitate pivotal movement of each support member.

32. The machine actuating system according to claim 21, wherein said machine controller comprises:

a) a housing having means for communicating with the machine;

b) an electrical control portion having means for receiving said actuation signal from the external processing system and means responsive to said actuation signal for electrically actuating the machine; and c) a pneumatic control portion having means for receiving said actuation signal from the external processing system and means responsive to said actuation signal for pneumatically actuating the machine.

33. A method for actuating a machine subject to satisfaction of predetermined conditions, wherein a pair of machine actuators each having a sensor array positioned in a predetermined location are provided and responsive to the presence of a plurality of fingers on each hand of an operator, said method comprising:

a) positioning the plurality of fingers on each hand of the operator in said predetermined location with respect to each sensor in said sensor array to generate a control signal to facilitate actuation of the machine; and b) transmitting said control signal to control means for receiving and processing said control signal and actuating the machine.

* * * * *